Figure 1:
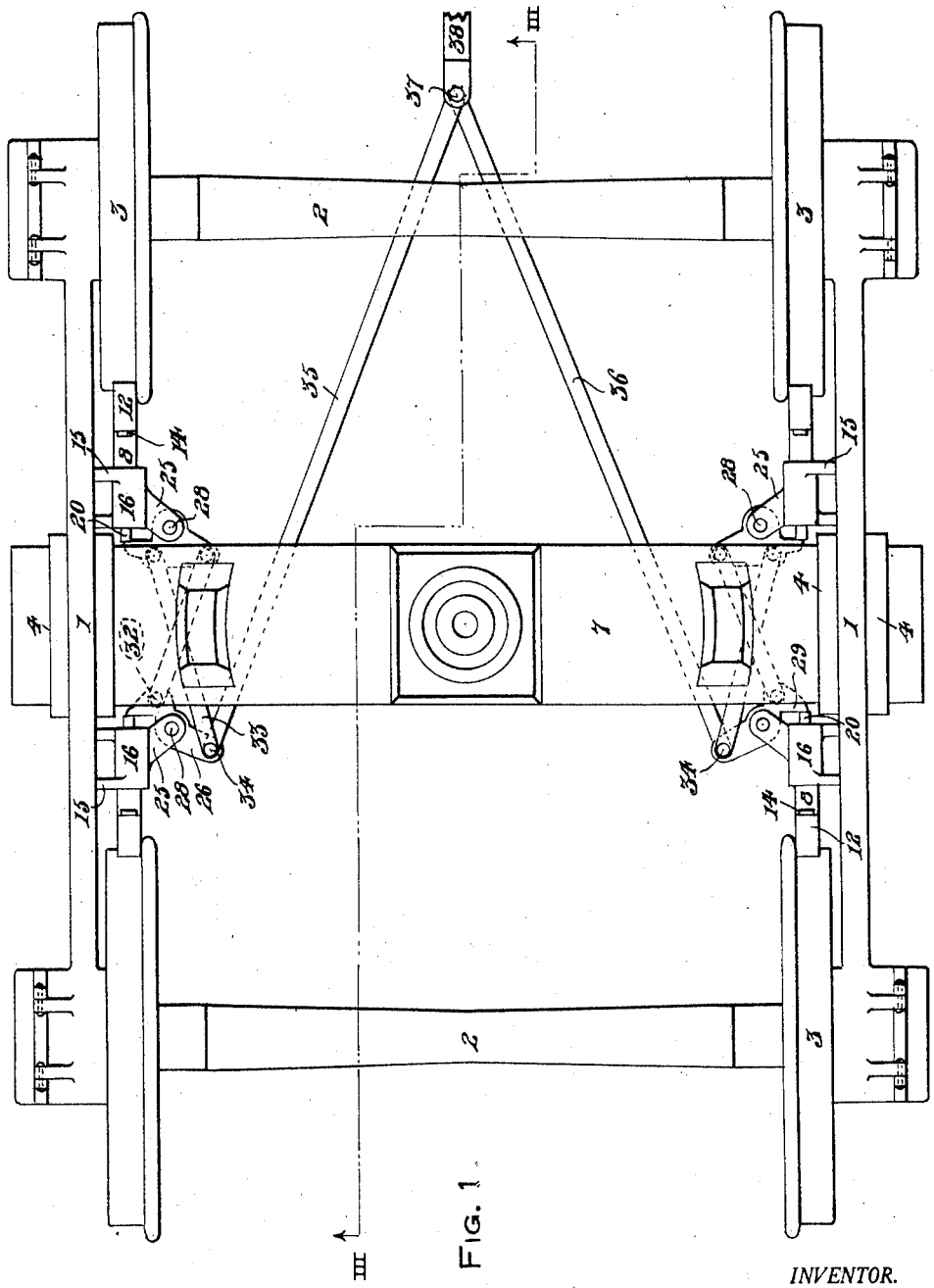

J. WISNIEWSKI.
RAILWAY CAR BRAKE.
APPLICATION FILED OCT. 19, 1920.

1,388,682.

Patented Aug. 23, 1921.
3 SHEETS—SHEET 2.

INVENTOR.
J. Wisniewski
BY
J. K. Bryant.
ATTORNEY.

J. WISNIEWSKI.
RAILWAY CAR BRAKE.
APPLICATION FILED OCT. 19, 1920.
1,388,682.
Patented Aug. 23, 1921.
3 SHEETS—SHEET 3.
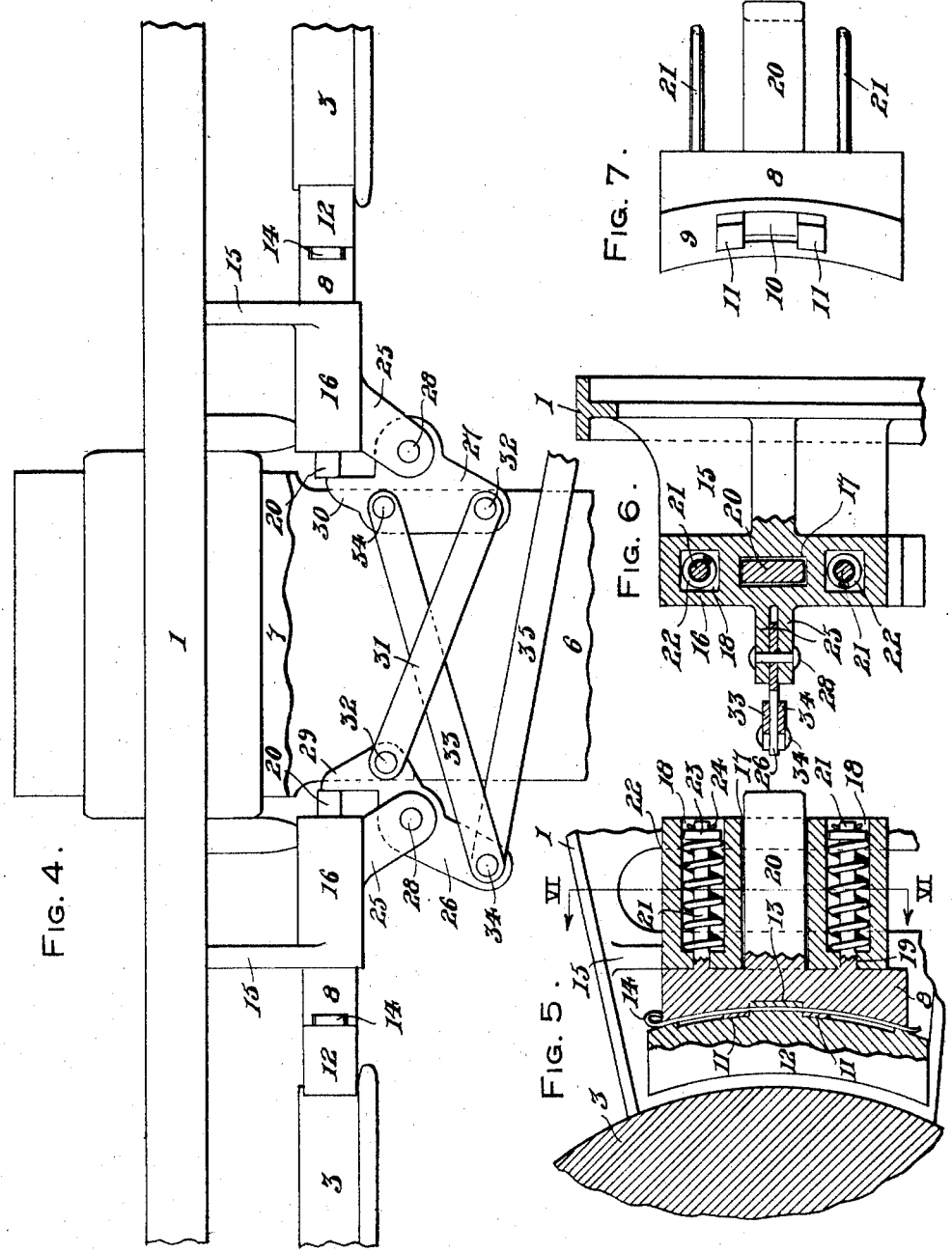
INVENTOR.
J. Wisniewski
BY
F. K. Bryant
ATTORNEY.

UNITED STATES PATENT OFFICE.

JOHN WISNIEWSKI, OF MILWAUKEE, WISCONSIN.

RAILWAY-CAR BRAKE.

1,388,682.           Specification of Letters Patent.     Patented Aug. 23, 1921.

Application filed October 19, 1920. Serial No. 417,970.

*To all whom it may concern:*

Be it known that I, JOHN WISNIEWSKI, a citizen of Poland, residing at Milwaukee, in the county of Milwaukee and State of Wisconsin, have invented certain new and useful Improvements in Railway-Car Brakes, of which the following is a specification.

This invention relates to certain new and useful improvements in railway car brakes and has for one of its objects to provide a brake embodying oppositely shifting shoes supported adjacent the car wheels on a supporting frame and having a link connection for simultaneous operation.

A further object of the invention is to provide a car brake embodying oppositely movable brake shoes supported on the truck frame with link connections between adjacent shoes for simultaneous operation.

A still further object of the invention resides in the specific mounting of a brake shoe for railway cars wherein the same is normally spring retracted to an operative position and adapted for longitudinal movement for engagement with a wheel through the operation of a set of lever and link devices.

With the above and other objects in view, the present invention consists in the novel form, combination and arrangement of parts hereinafter more fully described and shown in the accompanying drawings, in which like reference characters indicate similar parts throughout the several views.

Figure 2:
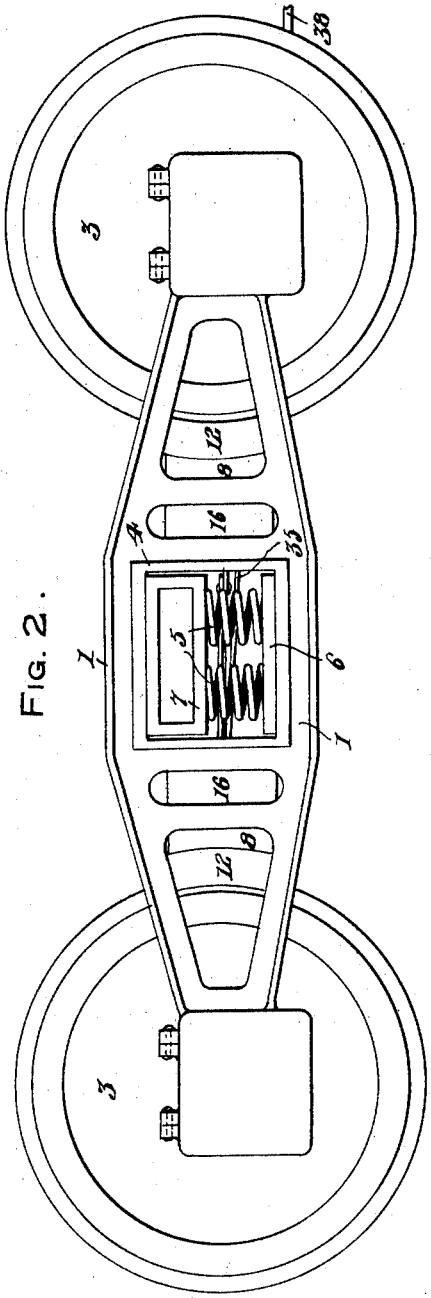
Figure 3:
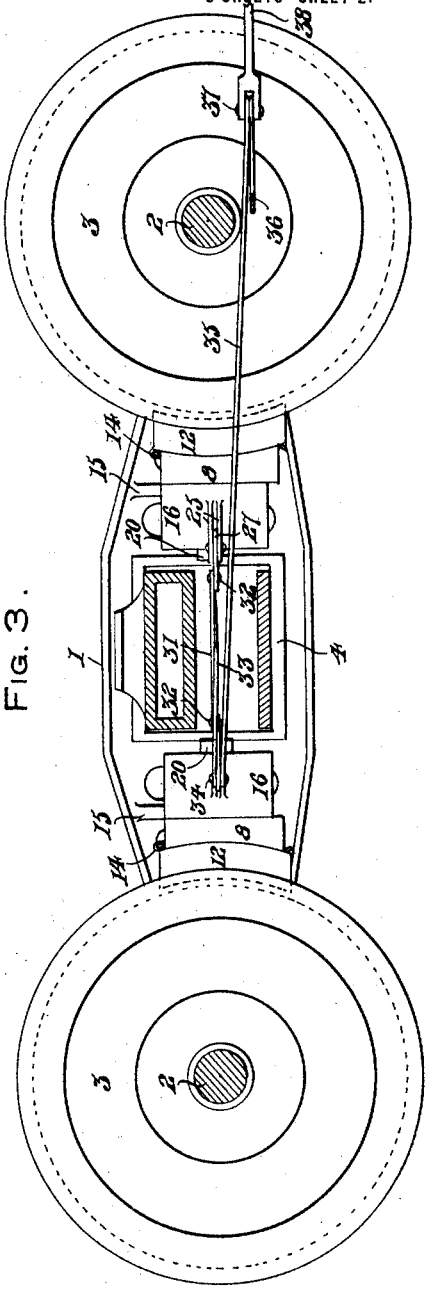

In the drawings,

Figure 1 is a top plan view of a car truck frame equipped with the improved brake shoe mechanism, Fig. 2 is a side elevational view of the truck frame showing the bolster springs, Fig. 3 is a longitudinal sectional view taken on line III—III of Fig. 1, Fig. 4 is a fragmentary top plan view of a portion of the truck frame showing the lever and link mechanism for simultaneously operating the brake shoes, Fig. 5 is a detail sectional view of a portion of the device showing the resilient mounting of the brake shoe block, Fig. 6 is a cross sectional view taken on line VI—VI of Fig. 5, and Fig. 7 is a perspective view of the brake shoe block removed from the supporting frame and with the brake shoe removed.

Referring more in detail to the accompanying drawings, there is illustrated a railway car truck embodying side bars 1 supporting at the opposite ends thereof axles 2 upon the ends of which track wheels 3 are journaled. A center transverse bolster 7 extends between the side bars 1 intermediate the ends thereof as clearly shown in Figs. 1 and 4. The bolster section 7 being rectangular in cross section as shown in Figs. 2 and 3 extends through sockets in the opposite side bars 1 and is inclosed by rectangular frames 4. Cushion springs are positioned within each rectangular frame and are mounted upon plates 6 within the frame and engage at their upper ends the adjacent sides of the bolster 7.

The brake shoes are shown in detail in Figs. 5, 6, and 7 and comprise a block 8 having a curved forward face 9 within which a central depression 10 is formed while an outwardly projecting lug 11 is carried by the face 9 of the block at each end of the depression 10. The brake shoe 12 has the rear face thereof curved coincident to the curvature of the block face 9 and carries a central lug 13 adapted for reception in the depression 10 in the block face and when so positioned, a curved key 14 is passed through alined openings in the lugs 11 and 13, thus to retain the shoe 12 securely mounted upon the block 8.

In mounting the shoe and supporting block upon the car frame, a bracket 15 carried by the side bar 1 adjacent each end of the axle 2, carries a head 16 having a central longitudinal passage 17 therein extending completely through the same. Upper and lower sockets 18 are formed in the head 16 in parallel with the central passage 17, the sockets 18 having the rear ends thereof unobstructed while the forward end of the head 16 in line with the sockets are provided with reduced openings 19. The shoe supporting block 8 has a central rearwardly directed plunger 20 and oppositely positioned plunger rods 21. The plunger 20 is freely slidable, in the socket opening 17 of the head 16 with the plunger rods 21 slidable in the sockets 18. A coil spring 22 surrounds each plunger rod 21 and is held under compression by the washer 23 secured by the cotter 24 upon the free end of the rod 21, thereby normally holding the brake shoe block retracted in an inoperative position engaging the head 16 as shown in Fig. 5. In this position, the end of the plunger 20 projects inwardly of the inner end of the mounting head 16 for engagement by operating devices for shifting the brake shoes against the tension of the springs 22.

To provide operating means for the brake shoes, each head 16 carries a bifurcated projection 25 within which, adjacent each side bar 1, levers 26 and 27 are respectively pivotally mounted upon pins 28. The lever 26 carries an angle extension foot 29 for engagement with the adjacent plunger 20 of a brake shoe while the lever 27 carries an angle foot extension 30 for similar engagement with an adjacent brake shoe. A link 31 is pivotally connected at its opposite ends as at 32 to the lever extension 29 and lever 27 respectively while a second link 33 is connected as at 34 to the lever extension 30 and the lever 26 thereby causing simultaneous operation of the feet extension 29 and 30. To cause a simultaneous operation of the brake shoes adjacent each side bar 1 of the truck frame, a pair of rods 35 and 36 are pivotally connected upon the pins 34 and are joined at their forward ends as at 37 for attachment to the operating shaft 38.

With the springs 22 in normal operation, the brake shoe 12 is retracted for engagement with the block 8 and spaced from the track wheel 3 as indicated in Fig. 5. When the operating shaft 38 is moved the rod connections 35 and 36 with the levers 26 shift the levers and cause the foot extensions 29 carried thereby to engage the adjacent plunger 20 of a brake shoe while the link connections 31 and 33 with the adjacent levers 26 effect operation of the foot extensions 30 for similar engagement with the brake shoes. Upon release of the operating shaft 38, the springs 22 will return the brake shoes to their inoperative positions.

While there is herein shown and described what is believed to be the preferred embodiment of the invention, it is nevertheless to be understood that minor changes may be made therein without departing from the spirit and scope of the invention as claimed.

What is claimed as new is:

1. A railway car brake comprising in combination with the side bars of a truck frame, mounting brackets, a lever pivoted in each bracket, a brake shoe resiliently mounted in the brackets, a foot extension carried by each lever for engagement with an adjacent brake shoe and operating means for the levers.

2. A railway car brake comprising in combination with the side bars of a truck frame, mounting brackets, a lever pivoted in each bracket, a brake shoe resiliently mounted in the brackets, a foot extension carried by each lever for engagement with an adjacent brake shoe, link connections between adjacent levers and operating means for one of said levers to effect simultaneous operation of all the brake shoes.

3. A railway car brake comprising in combination with the side bars of a truck frame, mounting brackets, a lever pivoted in each bracket, a brake shoe resiliently mounted in the brackets, a foot extension carried by each lever for engagement with an adjacent brake shoe, a foot extension carried by each lever for engagement with an adjacent brake shoe, link connections between adjacent levers and operating rods connected to one of the levers at each side of the truck frame to effect simultaneous operation of all of the brake shoes.

4. A railway car brake comprising in combination with the side bar of a truck frame, a bracket carried thereby, a brake shoe supporting block resiliently mounted in each bracket, a removable brake shoe carried by the block, operating means for the brake shoes carried by said brackets and means for simultaneously operating the last named means.

5. A railway car brake comprising in combination with the side bar of a truck frame, a bracket carried thereby, a brake shoe supporting block resiliently mounted in each bracket, a removable brake shoe carried by the block, operating means for the brake shoes carried by said brackets, devices connecting the brake shoe operating means whereby simultaneous operation of the brake shoes is effected.

6. A railway car brake comprising in combination with the side bar of a truck frame, brackets carried thereby, each bracket having vertically alined passages therein, a brake shoe including a central plunger and oppositely positioned plunger rods arranged in the passages in the bracket, coil springs associated with the plunger rods for holding the brake shoe normally retracted and operating means for the brake shoe plungers.

7. A railway car brake comprising in combination with the side bar of a truck frame, brackets carried thereby, each bracket having vertically alined passages therein, a brake shoe including a central plunger and oppositely positioned plunger rods arranged in the passages in the bracket, coil springs associated with the plunger rods for holding the brake shoe normally retracted, a lever carried by each bracket, a foot extension carried by each lever for engagement with the brake shoe plungers and means for operating the levers.

8. A railway car brake comprising in combination with the side bar of a truck frame, brackets carried thereby, each bracket having vertically alined passages therein, a brake shoe including a central plunger and oppositely positioned plunger rods arranged in the passages in the bracket, coil springs associated with the plunger rods for holding the brake shoe normally retracted, a lever carried by each bracket, a foot extension carried by each lever for engagement with the brake shoe plungers, connecting links between the levers and means for simultaneously shifting the levers.

In testimony whereof I affix my signature.

JOHN WISNIEWSKI.